United States Patent

Darmon et al.

[15] 3,706,985

[45] Dec. 19, 1972

[54] BINARY TO ONE OUT OF N CONVERTER

[72] Inventors: Jacques Darmon, 92-Sceaux; Philippe Coffre, 92-Boulogne, both of France

[73] Assignee: Jeumont-Schneider, Paris, France

[22] Filed: May 27, 1971

[21] Appl. No.: 147,591

[30] Foreign Application Priority Data

May 28, 1970 France....................................7019501

[52] U.S. Cl...........................340/347 DD, 340/147 T

[51] Int. Cl...............................................H03k 13/252

[58] Field of Search........340/347 DD, 147 R, 147 T; 235/154, 155; 317/137

[56] References Cited

UNITED STATES PATENTS

| | | | |
|---|---|---|---|
| 2,844,811 | 7/1958 | Burkhart | 340/147 T |
| 3,587,093 | 6/1971 | Paulsen | 340/347 DD |

*Primary Examiner*—Charles D. Miller
*Attorney*—Raymond A. Robic

[57] ABSTRACT

A data transmission selector having $n$ inputs and $2^n$ outputs, $n$ being greater than or equal to 2. The data transmission selector comprises: a first selector having $p$ inputs and $2^p$ outputs ($p$ denoting an integer which is at least 1 and less than $n$), the selector comprising $p$ two-way contacts each operated by a relay winding whose input is one of the selector inputs, each contact point of the moving element of such contacts being connected to the negative side of a d.c. supply while each of the other two contact points $a$ or $b$ is connected to the cathode of $2^{p-1}$ diodes, each anode of the diodes being so connected to one of the selector outputs that any of the contact points $a$ or $b$ of a two-way contact is connected via one of the diodes only once to one of the outputs and the contact points $a$ and $b$ of any single two-way contact are not connected to the same output; a second selector having $m$ inputs and $2^m$ outputs comprising $2^m-1$ two-way contacts operated by $m$ relay windings (whose inputs are the inputs of the second selector) and arranged in a pyramid of $m$ stages ($m$ being equal to $n-p$), the pyramid apex being connected to the positive side of the d.c. supply, the pyramid base comprising $2^m$ outputs; and connecting circuits between the outputs of the first and second selectors.

2 Claims, 1 Drawing Figure

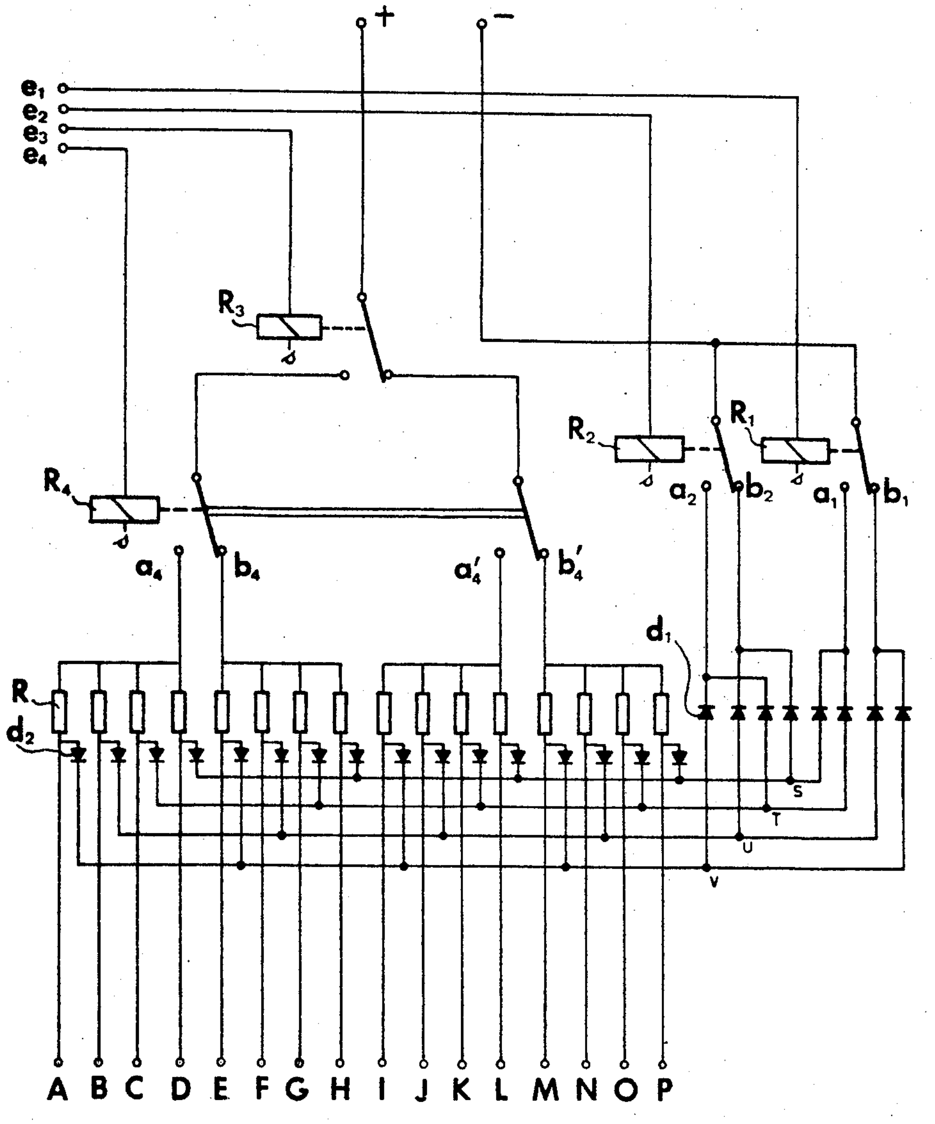
INVENTORS
Jacques DARMON
Philippe COFFRE
BY Raymond A. Robic
ATTORNEY

BINARY TO ONE OUT OF N CONVERTER

In data transmission, to which this invention relates, there are many selector facilities having logic elements comprising $n$ inputs and $2^n$ outputs, such that just a single output exists at the "1" level for each combination of input variables. There may be mentioned selectors having pyramid relay contacts in which there are $n$ relays and $2^n-1$ contacts; unfortunately, when $n$ is large, very many contacts are required and are loaded very unevenly. However, relays do have the advantage of ensuring electrical insulation between the input circuits and the output circuits. Also known are diode selectors having $n \times 2^{n-1}$ diodes for $n$ inputs and $2^n$ outputs; unfortunately, when $n$ is large a large number of diodes must be provided and there is no electrical insulation between the input and output circuits.

This invention, originated by Jacques Darmon and Philippe Coffre, is a selector comprising in association both the kinds of selector just outlined, but with the advantage over them individually that fewer contacts or diodes are required and the input circuits are electrically insulated from the output circuits.

The selector according to this invention has $n$ inputs and $2^n$ outputs ($n$ being grater than or equal to two) and comprises:

a first selector having $p$ inputs and $2^p$ outputs ($p$ denoting an integer which is at least 1 and less than $n$), the selector comprising $p$ two-way contacts, each contact point of the moving element of such contacts being connected to the negative side of a d.c. supply while each of the other two contact points $a$ or $b$ is connected to the cathode of $2^{p-1}$ diodes, each anode of the diodes being so connected to one of the selector outputs that any of the contact points $a$ or $b$ of the two-way contact is connected via one of the diodes only once to one of the outputs and the contact points $a$ and $b$ of any single two-way contact are not connected to the same output, each of the $p$ two-way contacts being operated by a relay winding whose input is one of the selector inputs;

a second selector having $m$ inputs and $2^m$ outputs comprising $2^m-1$ two-way contacts operated by $m$ relay windings (whose inputs are the inputs of the second selector) and arranged in a pyramid of $m$ stages ($m$ being equal to $n-p$), the pyramid apex being connected to the positive side of the d.c. supply, the pyramid base comprising $2^m$ outputs, and connecting circuits between the outputs of the first selector and second selector and devised as follows: each of the $2^p$ outputs of the first selector is connected via a diode in series with a resistance to each of the $2^m$ outputs of the second selector, the anode of each diode being on the same side as the resistance and each of the $2^n$ anode-to-resistance connecting lines being connected to an output terminal, to form the $2^n$ outputs of the resulting selector.

As a variant, the polarities of the d.c. supply can be reversed and all the diodes can be connected the reverse way round. In another variant, each two-way contact can be replaced by two transistors arranged not to be both simultaneously conductive or non-conductive.

The invention will be more clearly understood from the embodiment to be described hereinafter, for which a circuit diagram is shown in the single FIGURE forming the accompanying drawing.

The selector under consideration has four inputs $e_1$, $e_2$, $e_3$, $e_4$ which are the inputs of the windings of four relays $R_1$, $R_2$, $R_3R_4$ respectively; the selector has 16 outputs whose references are the letters of the alphabet from A to P. As compared with the parameters hereinbefore mentioned, the selector corresponds to $n = 4$, $m = 2$, $p = 2$ and has a d.c. supply indicated by its positive and negative terminals. The relay winding outputs $s$ can be connected e.g. to a frame or to a common terminal.

In the right-hand side of the drawing there can be seen a first selector comprising the two relays $R_1$, $R_2$ each operating a two-way contact; the contact points of the moving elements of the two-way contacts are connected to the negative side of the d.c. supply. The other contact points $a_1$, $b_1$, $a_2$, $b_2$ are each connected to the cathode of 2 diodes, as $d_1$. The 8 diodes $d_1$ are so connected in pairs via their anodes that two diodes connected by their cathodes to the contact point $a_2$ or $b_2$ are connected to the anodes of diodes connected to the contact point $a_1$ or $b_1$ and vice versa and there is only a single pair of diodes connecting $a_1$ to $a_2$, $a_1$ to $b_2$, $b_1$ to $a_2$ and $b_1$ to $b_2$ — i.e., any two $a$ or $b$ contact points of two different two-way contacts. The four inter-anode connecting wires thus obtained form the four outputs S, T, U, V of the first selector whose inputs are $e_1$ and $e_2$.

In the left-hand part of the diagram there can be seen a second selector comprising three two-way contacts connected in a two-stage pyramid whose apex — i.e., the contact point of the moving contact of the relay $R_3$ — is connected to the positive side of the d.c. supply. The pyramid base, which consists of only two stages is embodied by the two-way contacts operated simultaneously by the winding of relay $R_4$ and thus has four outputs $a_4$, $b_4$, $a'_4$, $b'_4$ which are the outputs of the second selector, the inputs thereof being $e_3$ and $e_4$.

Each of the first-selector outputs S, T, U, V is connected, via a diode $d_2$ in series with a resistance R, to each of the outputs $a_4$, $b_4$, $a'_4$, $b'_4$ of the second selector, the anode of each diode $d_2$ being disposed on the same side as the resistance R, and each of the resulting 16 anode-to-resistance connecting lines is connected to one of the terminals marked A to P in alphabetical order. These 16 terminals are the outputs of the selector according to the invention.

Assuming that the state of the contacts shown corresponds to the binary number 0000 (or 1111), it can be seen that only the output terminal O is at a negative potential, since the three outputs S, U, V are at a negative potential, T not having any fixed potential. Of the four outputs $a_4$, $b_4$, $a'_4$, $b'_4$ of the second selector only the output $b'_4$ is at a fixed — and positive — potential. Of the group of four diodes and resistances connected to the output $b'_4$ only a single diode is not conductive, namely the diode connected between the outputs T and O. Consequently, the terminals M, N and P are at a negative potential because of the relatively high voltage drop across the resistances connected to them as compared with the voltage drop across the conductive diodes connected to the points V, U and S. The terminal O is therefore the only one at a positive potential. The terminals A to L have no fixed potential.

If the positive and negative poles of the d.c. supply were to be reversed and if all the diodes were to be connected the reverse way round, the terminal O would then be the only output terminal of the selector at a negative potential.

The selector according to the invention is of use in data transmission, e.g., in matrix decoding of a data item, to which end two selectors of the kind described are associated with one another by a known method, one working on positive logic and the other on negative logic — i.e., the second selector haVing its positive and negative terminals and its diodes the opposite way round in relation to the first selector.

The selectors hereinbefore described are complete selectors; however, without departure from the scope of this invention they can be used as partial selectors if some of the output terminals are omitted.

We claim:

1. A data transmission selector having $n$ inputs and $2^n$ outputs, $n$ being greater than or equal to 2, characterized in that it comprises:

a first selector having $p$ inputs and $2^p$ outputs ($n$ denoting an integer which is at least 1 and less than $n$), the selector comprising $p$ two-way contacts, each contact point of the moving element of such contacts being connected to the negative side of a d.c. supply while each of the other two contact points $a$ or $b$ is connected to the cathode of $2^{p-1}$ diodes, each anode of the diodes being so connected to one of the selector outputs that any of the contact points $a$ or $b$ of a two-way contact is connected via one of the diodes only once to one of the outputs and the contact points $a$ and $b$ of any single two-way contact are not connected to the same output, each of the $p$ two-way contacts being operated by a relay winding whose input is one of the selector inputs;

a second selector having $m$ inputs and $2^m$ outputs comprising $2^m-1$ two-way contacts operated by $m$ relay windings (whose inputs are the inputs of the second selector) and arranged in a pyramid of $m$ stages ($m$ being equal to $n-p$), the pyramid apex being connected to the positive side of the d.c. supply, the pyramid base comprising $2^m$ outputs, and connecting circuits between the outputs of the first selector and second selector and devised as follows: each of the $2^p$ outputs of the first selector is connected via a diode in series with a resistance to each of the $2^m$ outputs of the second selector, the anode of each diode being on the same side as the resistance and each of the $2^n$ anode-to-resistance connecting lines being connected to an output terminal, to form the $2^n$ outputs of the resulting selector.

2. A selector according to claim 1 wherein the polarities of the d.c. supply are reversed and all the diodes are connected to the reverse way round.

* * * * *